US008972522B2

United States Patent
Kurihara et al.

(10) Patent No.: US 8,972,522 B2
(45) Date of Patent: Mar. 3, 2015

(54) INFORMATION DISTRIBUTION SYSTEM, INFORMATION DISTRIBUTION APPARATUS, INFORMATION COMMUNICATION TERMINAL, AND INFORMATION DISTRIBUTION METHOD

(75) Inventors: Shinichi Kurihara, Yokohama (JP); Sunao Wada, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 213 days.

(21) Appl. No.: 13/370,576

(22) Filed: Feb. 10, 2012

(65) Prior Publication Data
US 2012/0236950 A1 Sep. 20, 2012

(30) Foreign Application Priority Data
Mar. 15, 2011 (JP) .................... 2011-057127

(51) Int. Cl.
*G06F 15/16* (2006.01)
*H04L 29/08* (2006.01)
*H04L 29/06* (2006.01)

(52) U.S. Cl.
CPC .............. *H04L 67/12* (2013.01); *H04L 65/605* (2013.01)
USPC ............ 709/217; 709/218; 709/219; 370/395

(58) Field of Classification Search
CPC .............................. H04L 27/00; H04L 65/605
USPC .................................. 709/217–219; 370/395
See application file for complete search history.

(56) References Cited

U.S. PATENT DOCUMENTS

| 5,657,433 A | 8/1997 | Murase et al. |
| 7,368,652 B2 | 5/2008 | Iketani et al. |
| 7,490,107 B2 | 2/2009 | Kashino et al. |
| 7,712,123 B2 | 5/2010 | Miyaoku et al. |
| 2002/0042829 A1* | 4/2002 | Mizuhara et al. ............. 709/229 |
| 2003/0051252 A1* | 3/2003 | Miyaoku et al. .............. 725/109 |
| 2003/0101253 A1* | 5/2003 | Saito et al. .................... 709/223 |
| 2003/0152360 A1* | 8/2003 | Mukai et al. ................... 386/46 |

(Continued)

FOREIGN PATENT DOCUMENTS

| JP | 08-016610 | 1/1996 |
| JP | 2000-242661 | 9/2000 |

(Continued)

OTHER PUBLICATIONS

Backround Art Information with Concise Explanation for Japanese References Nos. 1 and 2 listed above, undated in 1 page.

(Continued)

*Primary Examiner* — Razu Miah
(74) *Attorney, Agent, or Firm* — Knobbe, Martens, Olson & Bear LLP

(57) ABSTRACT

According to one embodiment, an information distribution apparatus stores a characteristic information extracted arbitrary time-series data and relevant information in association of an information providing site on a communication line with each other, fetches characteristic information presented with a request for distribution through the line from a terminal, collates the fetched characteristic information with each characteristic information item of the stored associated information, determines the closest characteristic information, fetches relevant information associated with the characteristic information, and distributes the fetched relevant information to the terminal through the line.

8 Claims, 6 Drawing Sheets

(56) References Cited

U.S. PATENT DOCUMENTS

| | | |
|---|---|---|
| 2004/0019681 A1* | 1/2004 | Nakamura et al. ............ 709/226 |
| 2005/0021731 A1* | 1/2005 | Sehm et al. .................. 709/224 |
| 2005/0120095 A1* | 6/2005 | Aman et al. .................. 709/219 |
| 2006/0062363 A1* | 3/2006 | Albrett ..................... 379/101.01 |
| 2007/0118616 A1* | 5/2007 | Simongini et al. ............ 709/219 |
| 2007/0271186 A1* | 11/2007 | Kurihara et al. ................ 705/51 |
| 2008/0270569 A1* | 10/2008 | McBride et al. .............. 709/217 |
| 2009/0022078 A1* | 1/2009 | Patterson et al. ............. 370/311 |
| 2009/0287837 A1* | 11/2009 | Felsher ......................... 709/229 |
| 2010/0049922 A1* | 2/2010 | Aronovich et al. ........... 711/147 |
| 2010/0135306 A1* | 6/2010 | Lee et al. .................. 370/395.31 |
| 2010/0241716 A1* | 9/2010 | Akadiri .......................... 709/206 |
| 2010/0268560 A1* | 10/2010 | Raghunathan et al. ........... 705/7 |
| 2011/0145373 A1* | 6/2011 | Awad et al. .................. 709/220 |
| 2011/0250835 A1* | 10/2011 | Sagae et al. ................. 455/3.05 |
| 2012/0131139 A1* | 5/2012 | Siripurapu et al. ........... 709/217 |

FOREIGN PATENT DOCUMENTS

| | | |
|---|---|---|
| JP | 2002-041569 | 2/2002 |
| JP | 2002-175311 | 6/2002 |
| JP | 2006-106818 | 4/2006 |
| JP | 2007-116718 | 5/2007 |

OTHER PUBLICATIONS

Japanese Office Action for corresponding Japanese Application No. 2011-057127, mailed Jan. 15, 2013, in 4 pages.

* cited by examiner

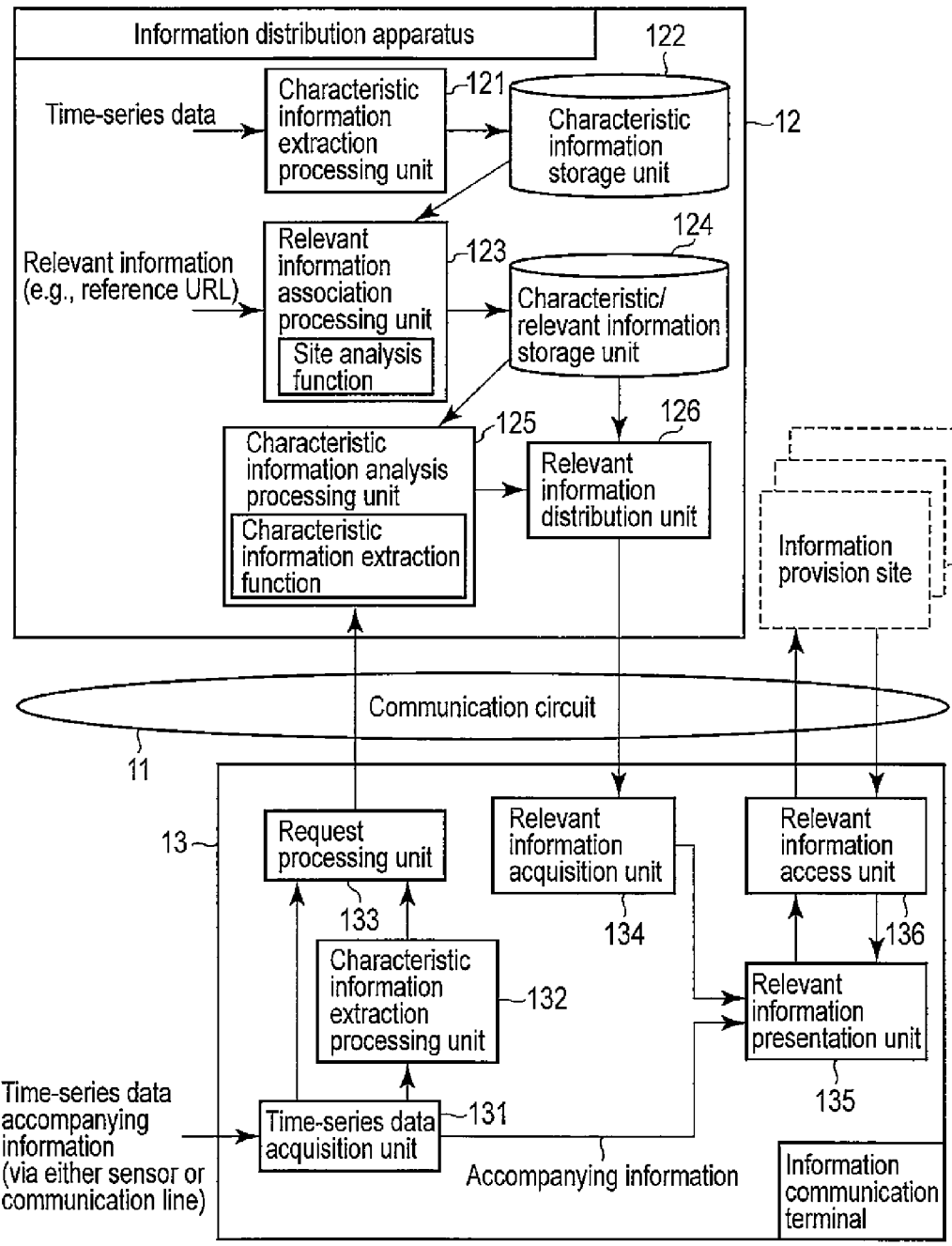
F I G. 1

Characteristic information storage unit (example of management data)

| Seq No | Classification | Time-series data storage position |
|---|---|---|
| 0001 | Video | /root//video/20151223 |
| 0002 | Still image | /root//still image/20151223 |
| 0003 | Sound | /root//sound/20151223 |
| 0004 | Number of steps/pulse rate | /root//number of steps, pulse rate/20151223 |
| 0005 | GPS/map | /root//GPS, map/20151223 |
| ⋮ | ⋮ | ⋮ |

FIG. 2

Characteristic/relevant information storage unit (example of management data)

| Seq No | Classification | Time-series data storage position | Relevant information 1 | Relevant information 2 | ------ | Relevant information XX |
|---|---|---|---|---|---|---|
| 0001 | Video | /root//video/20151223 | http://www.cm1.co.xx | http://www.cm2.co.xx | ------ | http://www.cm1.co.xx |
| 0002 | Still image | /root//still image/20151223 | http://www.cm7.co.xx | http://www.cm7.co.xx | ------ | http://www.cm1.co.xx |
| 0003 | Sound | /root//sound/20151223 | http://www.cm9.co.xx | http://www.cm2.co.xx | ------ | http://www.cm1.co.xx |
| 0004 | Number of steps/pulse rate | /root//number of steps, pulse rate/20151223 | http://www.cm5.co.xx | http://www.cm5.co.xx | ------ | http://www.cm8.co.xx |
| 0005 | GPS/map | /root//GPS, map/20151223 | http://www.cm101.co.xx | ------ | ------ | ------ |
| ------ | ------ | ------ | ------ | ------ | | |

FIG. 3

INFORMATION DISTRIBUTION SYSTEM, INFORMATION DISTRIBUTION APPARATUS, INFORMATION COMMUNICATION TERMINAL, AND INFORMATION DISTRIBUTION METHOD

CROSS-REFERENCE TO RELATED APPLICATIONS

This application is based upon and claims the benefit of priority from prior Japanese Patent Application No. 2011-057127, filed Mar. 15, 2011; the entire contents of which are incorporated herein by reference.

FIELD

Embodiments described herein relate generally to, e.g., an information distribution system that provides information concerning time-series data upon presentation of a characteristic part of the time-series data of music or video pictures, an information distribution apparatus, an information communication terminal, and an information distribution method.

BACKGROUND

In recent years, there has been rendered an information distribution service for providing relevant information, e.g., a title, an artist, an album, and others of music by presenting a characteristic part of the music used in commercials and others. Further, a search service for specific relevant information such as other albums of an artist, a hit chart in the same category, and others is also provided in addition to the provision of the relevant information. The number of users of such a search service for contents relevant information is increasing since information concerning interesting contents can be easily obtained.

However, in the conventional relevant information distribution service, provision of information after initial provision is not carried out unless a user requests detailed or relevant information, and hence effective utilization is not attained on a service provider side. Furthermore, when the user obtains relevant information other than selective items prepared at the service providing site in advance, there is additionally required an operation, e.g., accessing a search site to perform search by a keyword, memorizing a URL included in provided relevant information to be directly input to a browser, shooting a matrix type two-dimensional code shown in a provided video picture and reading and registering an access destination, and others, and processing is troublesome for general users.

On the other hand, although the information distribution is restricted to recreational contents, similar information distribution is attempted in a telemedical diagnostic system. That is, like a pioneer of a medical care service at home, it is a system that parameters such as a body temperature, a pulse rate, a blood pressure and others are measured by sensors, and times-series data obtained by this measurement is supplied to a healthcare server of a medical system through a network to undergo a checkup and others about the progress of a disease condition and others. However, in such a telemedical diagnostic system, a server is configured to be capable of accepting processible measurement data alone, patients are restricted to those who have been diagnosed with a disease in advance, and this system does not cope with simple healthcare that a type of disease is determined from health checks or symptoms and relevant information is provided.

BRIEF DESCRIPTION OF THE DRAWINGS

FIG. 1 is a block diagram showing a configuration of an information distribution system comprising an information distribution apparatus and an information communication terminal according to this embodiment;

FIG. 2 is a view showing an example of management data stored in a characteristic information storage unit according to the embodiment depicted in FIG. 1;

FIG. 3 is a view showing an example of management data stored in a characteristic/relevant information storage unit according to the embodiment depicted in FIG. 1;

DETAILED DESCRIPTION

Figure 4:
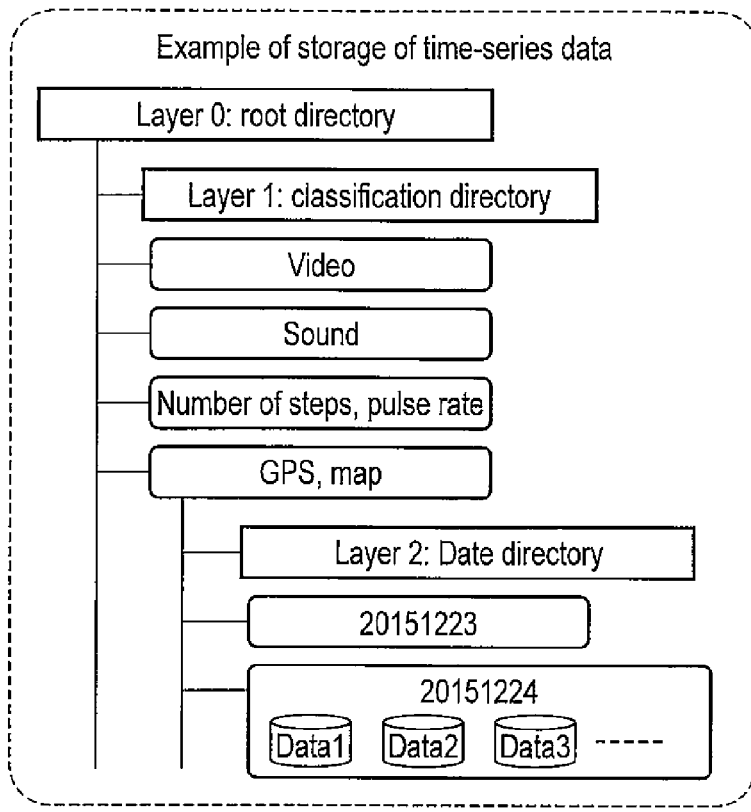
FIG. 4 is a view showing an example of storage of the management data and time-series data depicted in FIG. 2 and FIG. 3.

In general, according to one embodiment, an information distribution system comprising, an information distribution apparatus which receives arbitrary time-series data to extract each characteristic information item in advance, fetches relevant information including a reference address of an information providing site on a communication line that provides related information in regard to each extracted characteristic information item, stores the characteristic information and the relevant information in association with each other, fetches the time-series data or its characteristic information presented with a request for distribution of the relevant information through the communication line, extracts the characteristic information when the time-series data is fetched, collates the fetched characteristic information or the extracted characteristic information with each characteristic information item of the stored associated information, determines characteristic information which is recognized as the closest, fetches relevant information associated with the characteristic information, and distributes the fetched relevant information to a distribution request source via the communication line, and an information communication terminal which transmits arbitrary time-series data or its characteristic information to the information distribution apparatus via the communication line to request distribution of relevant information of the time-series data, receives distribution of relevant information associated with the request from the information distribution apparatus, presents the distributed relevant information, and guides accessing an information providing site on the communication line based on the reference address.

This embodiment will now be described hereinafter with reference to the drawings.

FIG. 1 is a block diagram showing a configuration of an information distribution system including an information distribution apparatus and an information communication terminal according to this embodiment. In FIG. 1, to a communication line 11 are connected various kinds of information providing sites besides an information distribution apparatus 12 and an information communication terminal 13.

The information distribution apparatus 12 includes a characteristic information extraction processing unit 121, a characteristic information storage unit 122, a relevant information association processing unit 123, a characteristic/relevant information storage unit 124, a characteristic information analysis processing unit 125, and a relevant information distribution unit 126.

The characteristic information extraction processing unit 121 acquires video data, audio data, or combined data of video/audio of music distributed via television or radio, divides the combined data into video data and audio data in case of the combined data of video/audio, and extracts each characteristic information item. Alternatively, sensors that measure weather parameters such as an air temperature (a temperature) or humidity, health parameters such as a body temperature, a pulse rate, a blood pressure, or the number of steps, or parameters such as inertia, GPS (positional information), or gas/liquid/solid component information are connected, sensor detection data is fetched, and information of a characteristic section is extracted. An extraction target of the characteristic information will be referred to as time-series data hereinafter. The characteristic information extracted here is stored in the characteristic information storage unit 122.

In the extraction of video pictures, at least one of luminance and a color difference is detected from non-encoded video data while matching a playback time, and characteristic information extraction sampling is effected with time information. When the video data is encoded, it is converted into non-encoded video data to be subjected to characteristic information extraction sampling.

As a method of the characteristic information extraction sampling for video pictures, some of the pictures are extracted from the video by point specification, and they are stored in the characteristic information storage unit 122 in association with time interval information. Further, in regard to sampling density, gradual selection is enabled, namely, (1) the amount of data is large when the density is high, and (2) the amount of data is small when the density is low.

In the extraction of audio, non-encoded audio data is classified in accordance with each specific frequency while matching a playback time, and characteristic information extraction sampling is carried out with time information. When the audio data is encoded, it is converted into non-encoded audio data to be subjected to this operation.

As a method of the characteristic information extraction sampling for audio, some of specific frequencies are extracted from the audio, and they are stored in the characteristic information storage unit 122 in association with the time interval information. Furthermore, in regard to sampling density, gradual section is enabled, namely, the amount data is large when the density is high, and the amount of data is small when the density is low.

Moreover, the relevant information association processing unit 123 associates video characteristic information, audio characteristic information, or video/audio characteristic information, which is obtained by combining the video characteristic information with the audio characteristic information using one item of time interval information, stored in the characteristic information storage unit 122 with acquiring information concerning part or all of the characteristic information based on time division, e.g., a reference URL. Characteristic/relevant information acquired here is stored in the characteristic/relevant information storage unit 124. At this time, it is desirable to enable configuring±threshold setting based on a ratio (%) of the time interval information of the extracted items of data.

It is desirable to add accompanying information such as air temperature (a temperature), humidity, body temperature, pulse rate, the number of steps, inertia, GPS (positional information), or gas/liquid/solid component information, which has been listed as the characteristic information extraction target, in accordance with characteristics of a relevant information providing site besides the reference URL of the relevant information providing site.

The characteristic information analysis processing unit 125 accepts an inquiry request for the characteristic information supplied from the information communication terminal 13 and determines which one of data whose characteristic information has been already extracted and all the video/audio data whose characteristic information has not been extracted the characteristic information inquiry concerns. In case of the data whose characteristic information has been already extracted, the data stored in the characteristic/relevant information storage unit 124 is searched for the characteristic information. In case of the data whose characteristic information has not been extracted, the data stored in the characteristic/relevant information storage unit 124 is searched while using the same algorithm as that of the characteristic information extraction processing unit 121 to extract the characteristic information. In the search, one or more candidates are refined based on partial match in the descending order of concordance rate. The concordance rate is stored in accordance with each candidate.

The relevant information distribution unit 126 acquires the one or more items of candidate information selected by the characteristic information analysis processing unit 125 and the concordance rates for the respective candidates, obtains corresponding relevant information from the characteristic/relevant information storage unit 124, and distributes this information to the information communication terminal 13 which has issued the request. It is to be noted that the relevant information may be obtained from the characteristic information analysis processing unit 125.

FIGS. 2 to 4 show examples of information storage of the information distribution apparatus 12. FIG. 2 shows an example of management data stored in the characteristic information storage unit 122. This example includes sequence numbers (Seq No.), classification, and time-series data storage positions as management items. FIG. 3 shows an example of management data stored in the characteristic/relevant information storage unit 124. In this example, an item of relevant information 1 to XX is added to the respective items, i.e., the sequence numbers (Seq No.), the classification, and the time-series data storage positions.

In regard to the time-series data for the management data, as shown in FIG. 4, a classification directory is created as Layer 1 below a root directory, and a date directory is created as a Layer 2 below respective divided directories, whereby a hierarchical structure for storing the time-series data in this date directory is provided. According to this structure, the classification is first searched, and the date directories are searched for the relevant information in the reverse chronological order, thereby relatively efficiently effecting the search.

On the other hand, the information communication terminal 13 includes a time-series data acquisition unit 131 using varies kinds of sensor detection data besides the video/audio data, a characteristic information extraction processing unit 132, a request processing unit 133, a relevant information acquisition unit 134, a relevant information access unit 135, and a relevant information presentation unit 136.

The time-series data acquisition unit 131 acquires video data, audio data, or combined data of video/audio from a terminal external device such as a camera or a microphone through the communication line 11, or time-series data such as an air temperature (a temperature), humidity, a body temperature, a pulse rate, the number of steps, inertia, GPS (positional information), or gas/liquid/solid component information from, e.g., a sensor. In case of the combined data of video/audio, it is divided into video data and audio data in association with time interval information. To input the time-series data, it is desirable to enable selectively switching a time input mode in which input is carried out in a unit time, a content input mode in which input is effected in units of contents, and a continuous input mode in which input is performed until stop is instructed.

Noise elimination and adjustment are carried out in case of video pictures, and noise elimination is performed in case of audio data. Moreover, an air temperature (a temperature), humidity, a body temperature, a pulse rate, the number of steps, inertia, GPS (positional information), gas/liquid/solid component information, and others from, e.g., a sensor may be acquired as accompanying information of video/audio.

It is desirable to enable selecting whether the characteristic information extraction in the information communication terminal 13 can be performed on the terminal side based on processing functions, resources, and others of the terminal.

The characteristic information extraction processing unit 132 acquires video data, audio data, or sensor detection data from the time-series data acquisition unit 131 and extracts characteristic information from each of video pictures, audio, and time-series data of sensor detection results based on the same algorithm as that of the characteristic information extraction processing unit 121 in the information distribution apparatus 12. The identity of the algorithm can be maintained by download from the information distribution apparatus 12.

It is to be noted that characteristic information extraction processing unit 132 is under relatively heavy loadimposed byon characteristic extraction processing carried out in this characteristic information extraction processing unit 132, and hence the characteristic information analysis processing unit 125 of the information distribution apparatus 12 may be in charge of the characteristic extraction without providing the unit 132 on the terminal side.

When extracting video pictures, at least one of luminance and a color difference is detected from non-encoded video data while matching a playback time, and characteristic information extraction sampling is carried out with time information. When the video data is encoded, it is converted into non-encoded video data to be subjected to this operation. As a method of the characteristic information extraction sampling for the video pictures, some of the video pictures are extracted based on point specification, and they are issued to the request processing unit 133 in association with time interval information. In regard to sampling density, gradual selection is enabled, namely, the amount of data is large when the density is high, and the amount of data is small when the density is low.

When extracting audio, non-encoded audio data is classified in accordance with each specific frequency while matching a playback time, and characteristic information extraction sampling is carried out with time information. When the audio data is encoded, it is converted into non-encoded audio data to be subjected to this operation. As a method of the characteristic information extraction sampling of the audio, some of specific frequencies are extracted, and they are issued to the request processing unit 133 in association with time interval information. In regard to sampling density, gradual selection is enabled, namely, the amount of data is large when the density is high, and the amount of data is small when the density is low.

The request processing unit 133 accesses the information distribution apparatus 12 through the communication line 11, issues the video data, the audio data, the combined data of video/audio, or the sensor detection data acquired from the time-series data acquisition unit 131, and the accompanying data as required, or obtains video characteristic information data, audio characteristic information data, or video/audio characteristic information data having the video characteristic information and the audio characteristic information combined based on one item of time interval information acquired from the characteristic information extraction processing unit 132, or the sensor detection data, issues the accompanying information as required, and places an inquiry request for relevant information.

The relevant information acquisition unit 134 acquires one or more items of relevant information and a concordance rate for each relevant information item from the information distribution apparatus 12, and issues them to the relevant information presentation unit 135. At this time, when acquisition of conformance information concerning the accompanying information is desired, this information is also issued to the relevant information presentation unit 135.

The relevant information presentation unit 135 includes a presentation device (not shown) such as a display or speaker to appropriately present input information, and it acquires one or more items of relevant information and a concordance rate for each relevant information item from the relevant information acquisition unit 134 and accesses an information providing site having the highest concordance rate through the relevant information access unit 136 based on the relevant information to acquire the relevant information presented by this site. If it is possible to access a corresponding to relevant information providing site by selection or setting to acquire information even though the highest concordance rate is not provided, options of users are broadened, and desired information can be easily obtained.

Additionally, when the conformance information concerning the accompanying information has been also acquired, corresponding information is issued at appropriate timing at the time of accessing a relevant information providing site if there is information indicating that the time-series data (the video data/the audio data/the sensor detection data) acquired by the time-series data acquisition unit 131 in the terminal coincides with the conformance information.

Description will now be given as to a flow of processing in the information distribution apparatus 12 and the information communication terminal 13 in the information distribution system having the above-described configuration with reference to FIG. 5 to FIG. 7.

Figure 5:
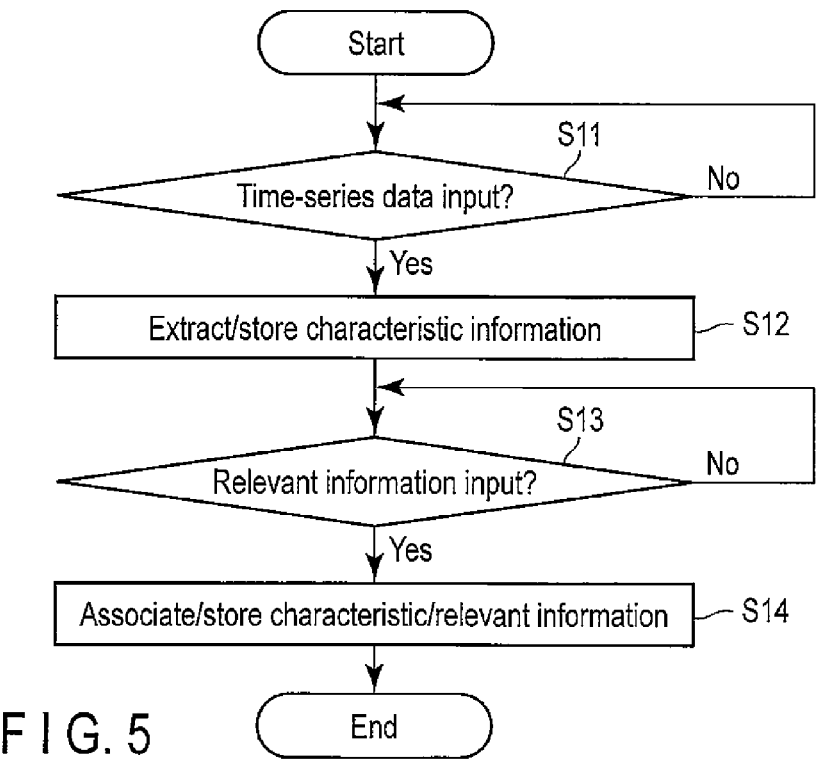
FIG. 5 is a flowchart showing a flow of processing concerning association/storage of characteristic information and relevant information according to the embodiment depicted in FIG. 1.

FIG. 5 is a flowchart showing a flow of processing concerning association/storage of characteristic information and relevant information in the information distribution apparatus 12. In FIG. 5, when time-series data is input (step S11), characteristic information is extracted from this input data based on a predetermined algorithm, the extracted information is stored in the characteristic information storage unit 122 (step S12), input relevant information is associated with the already stored characteristic information upon receiving the relevant information (step S13), and the associated information is stored in the characteristic/relevant information storage unit 124 (step S14).

Figure 6:
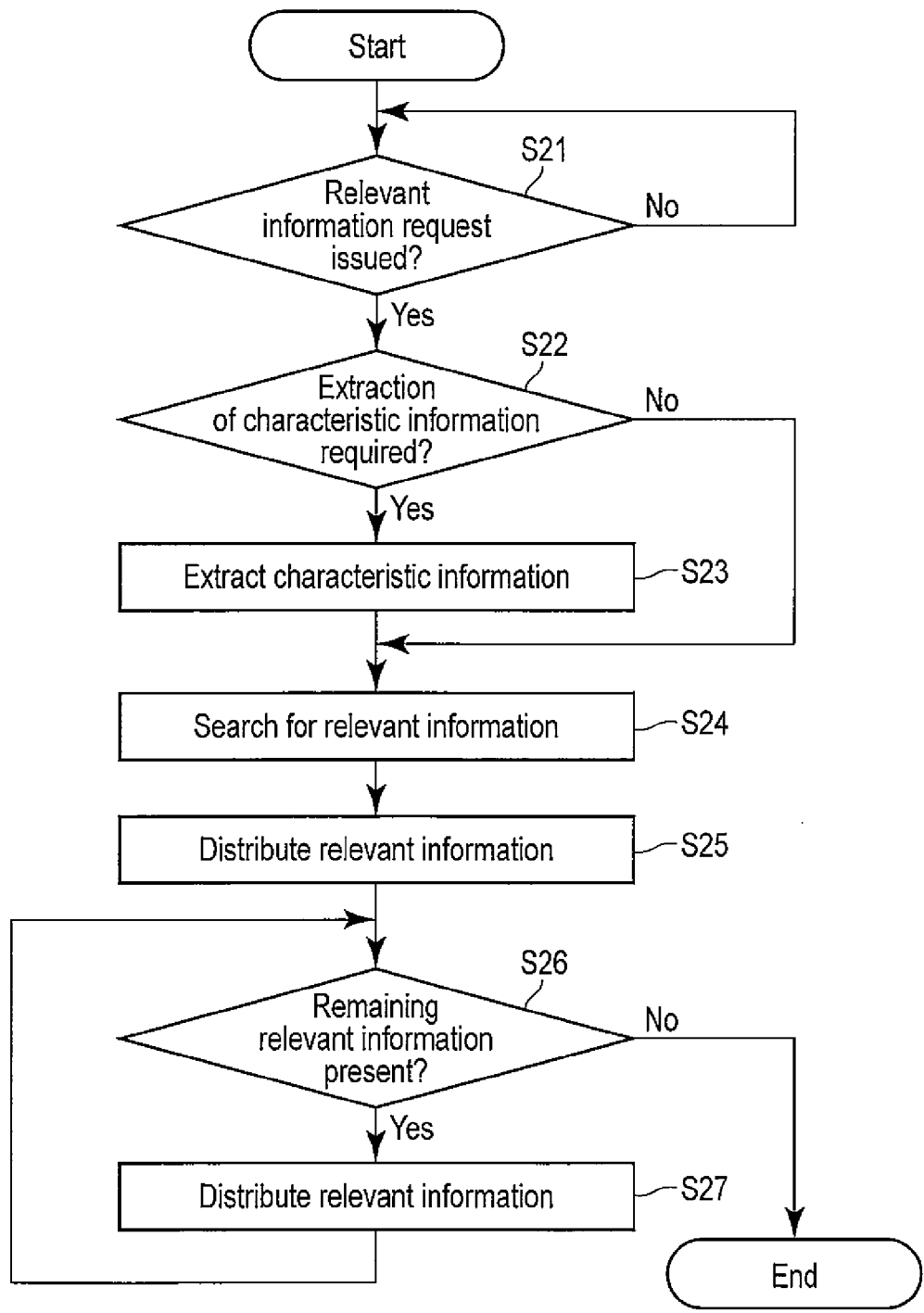
FIG. 6 is a flowchart showing a flow of processing from a relevant information request to relevant information distribution according to the embodiment depicted in FIG. 1.

FIG. 6 is a flowchart showing a flow of processing from a request to distribution of the relevant information in the information distribution apparatus 12. In FIG. 6, a relevant information request is first accepted (step S21), then whether the input data is data whose characteristic information has been extracted is determined (step S22), and the characteristic extraction processing is executed in the characteristic information analysis processing unit 125 when the input data is time-series data and characteristic information must be extracted (step S23).

When the characteristic information is acquired at steps S22 and S23, the control advances to the relevant information search processing, and the stored characteristic/relevant information is searched for corresponding relevant information in regard to the input characteristic information (step S24). When the relevant information has been searched for in this manner, the searched relevant information is distributed to the request source (step S25). Then, whether remaining information which has not been distributed is present in the searched relevant information is determined (step S26), the remaining information is sequentially distributed (step S27), and a processing sequence is terminated when distribution of all the information is finished.

Figure 7:
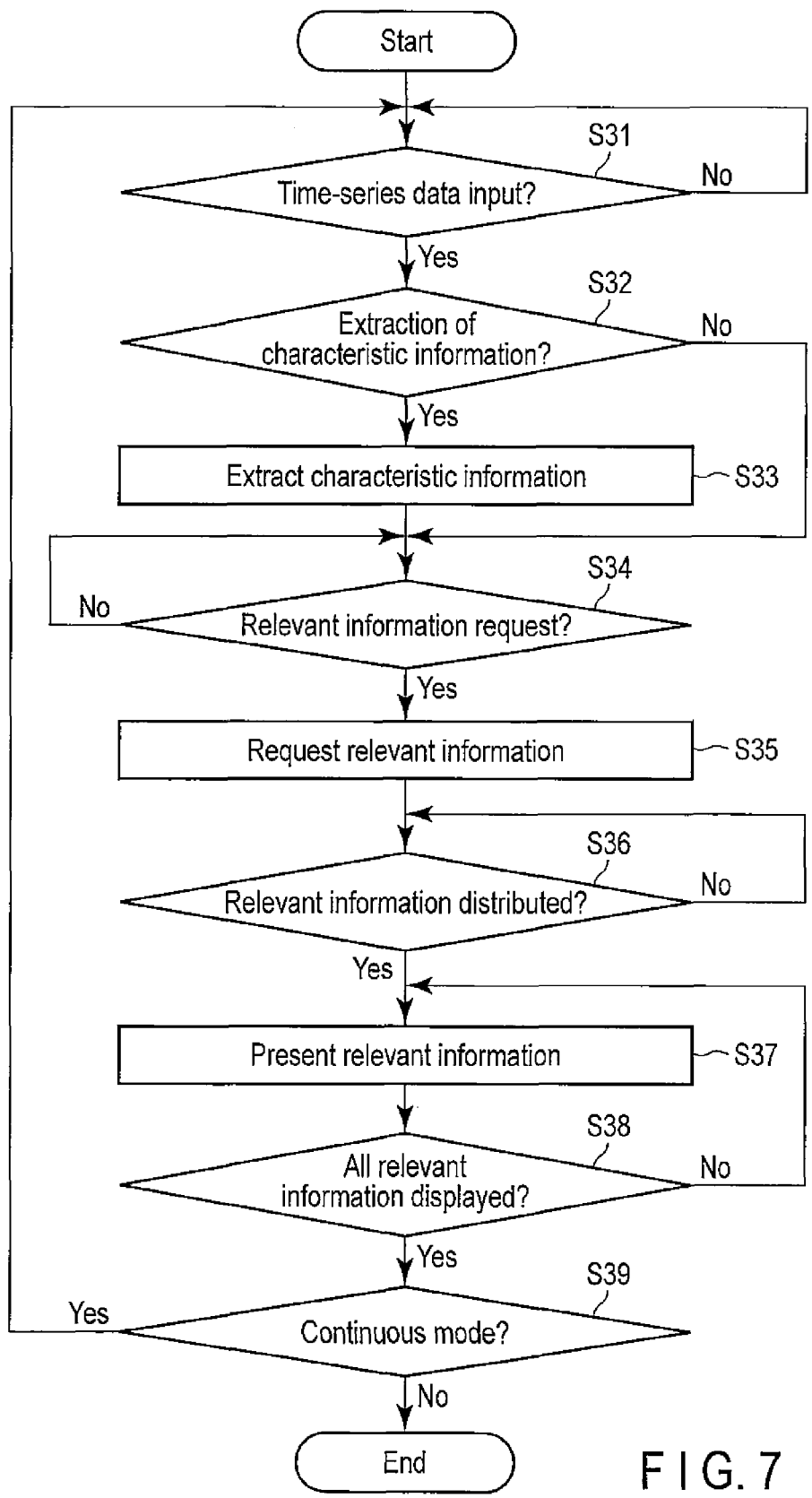
FIG. 7 is a flowchart showing a flow of processing from time-series data input to relevant information presentation on an information communication terminal side according to the embodiment depicted in FIG. 1.

FIG. 7 is a flowchart showing a flow of processing executed by the information communication terminal 13 with respect to the information distribution apparatus 12 which performs the above-described processing. The information communication terminal 13 executes the following processing.

First, when time-series data is input (step S31), whether characteristic information is to be extracted is asked (step S32), the characteristic information is extracted if the extraction of the characteristic information is required (step S33). In this determination, considering, e.g., a communication environment is desirable. That is, it is possible to extract the characteristic data to reduce the amount of data when a transmission capacity is low or transmitting the time-series data as it is when the transmission capacity is high so that the information distribution apparatus 12 side can be in charge of extraction of the characteristic information.

When a request for relevant information is issued in regard to the thus extracted characteristic information or the time-series data (step S34), the information distribution apparatus 12 is requested for the relevant information (step S35), and the control waits for distribution of the relevant information from the information distribution apparatus 12 (step S36). When the relevant information is distributed, this relevant information is presented (step S37), and then whether all items of relevant information have been presented is determined (step S38). Here, continuous acquisition of the relevant information is taken into consideration, whether the continuous mode is set is determined, the control returns to step S31 to execute a processing sequence when the continuous mode is set, or the processing is terminated as it is when the continuous mode is not set.

As described above, according to this embodiment, the characteristic information of the time series data as video/audio/sensor detection results is extracted on the information distribution apparatus 12 side, the relevant information such as an URL associated with a relevant information providing site is stored, and the information communication terminal 13 acquires part or all of the video/audio data or the sensor detection data, the information distribution apparatus 12 is asked via the communication line about the acquired data or at least part of the data whose characteristics information has been extracted on the terminal side, and distribution of the relevant information associated on the information distribution apparatus 12 side is received, whereby the relevant information providing site can be accessed to obtain the intended relevant information. As described above, the relevant information associated with video/audio can be easily obtained, and provision of in-depth information which is an issue is enabled.

For example, when the information communication terminal 13 receives GPS information, extracts current position information as the characteristic information, and transmits this current position information to the information distribution apparatus 12 to request relevant information, the information distribution apparatus 12 not only distributes surrounding guide information of, e.g., stores or events close to the supplied positional information but also adds and sequentially distributes URL information introducing particulars of each guide information item. The terminal 13 side presents the distributed surrounding guide information, accesses the URL information of an information providing site relevant to the presented information, and automatically presents the relevant information. When a user develops an interest in the relevant information, he/she can access this site to obtain necessary information.

Further, in a medical institution, it is possible to realize an application wherein characteristic information of sensor information such as a body temperature or a pulse rate according to a type of a disease is classified and registered in the information distribution apparatus 12 in advance and URL information of a relevant information site introducing a disease name and its particulars conforming to characteristics is distributed to help estimating the situation of the disease when the sensor information, e.g., the body temperature or the pulse rate is acquired to ask the information distribution apparatus 12 about the relevant information. Further, even a person who is not a patient can cope with simple healthcare by providing health indicator information from contents informing a daily measurement result, determining a type of a disease from health checks or symptoms, and providing relevant information of the determined disease, whereby more people can utilize such a system. As described above, when providing registered information concerning a content characteristic part, since more detailed information or a relevant information access destination is provided, it is possible to provide the information distribution system, the information distribution apparatus, the information distribution method, and the information communication terminal that can motivate the user's intention to acquire information and support search for information.

It is to be noted that the description has been given as to the example where the processing of extracting the characteristic information from the time-series data is executed by the characteristic information extraction unit 132 of the information communication terminal 13 in the foregoing embodiment, but the characteristic information analysis processing unit 125 of the information distribution apparatus 12 may have the function of extracting the characteristic function, as shown in FIG. 1, for example. In this case, the load on the processing performed on the information communication terminal 13 side can be reduced.

Furthermore, the description has been given as to the example where an information providing site of an external link is in charge of analysis of provided information. As shown in FIG. 1, if the relevant information association processing unit 123 of the information distribution apparatus 12 has the function of analyzing the providing site, and a result of the analysis based on the function is registered in the characteristic/relevant information storage unit 124, then a user can immediately receive desired information on the providing site, which is more advantageous.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information distribution apparatus connecting to an information communication terminal via a communication line, comprising:
   one or more first storage configured to store information items; and
   one or more second storage having encoded thereon instructions for execution by at least one processor, the instructions causing the at least one processor to:
   receive a plurality of time-series data items, extract a characteristic information item from each of the time-series data items at a designated time interval, and cause the characteristic information items and time interval information items about the time interval to be stored in the one or more first storage;
   fetch a relevant information item comprising a reference address of an information providing site on the communication line, receive from the one or more first storage the characteristic information items and time interval information items, associate the relevant information item and the time interval information item to each corresponding characteristic information item of the characteristic information items, and cause the relevant information items to be stored in the one or more first storage, the information providing site configured to provide related information for each characteristic information item;
   accept a distribution request from the information communication terminal with input data via the communication line, the input data corresponding to a time-series data item or a characteristic information item;
   collate the accepted characteristic information item or a characteristic information item extracted from the accepted time-series data item at the time interval with the characteristic information items stored in the one or more first storage;
   determine a characteristic information item among the characteristic information items stored in the one or more first storage which is at least the most similar to the accepted characteristic information item or the extracted characteristic information item; and
   fetch the relevant information item stored in the one or more first storage associating with the determined characteristic information item; and
   distribute the fetched relevant information item stored in the one or more first storage to the information communication terminal via the communication line.

2. The apparatus of claim 1,
   wherein each of the time-series data items data from a sensor that measures an item, and the characteristic information item is extracted from each of the time-series data items from the sensor in accordance with characteristics of a measurement target.

3. The apparatus of claim 1,
   wherein the instructions further cause the at least one processor to analyze provided information at the information providing site on the communication line.

4. An information communication terminal for use in an information distribution system, comprising:
   one or more storage having encoded thereon instructions for execution by at least one processor, the instructions causing the at least one processor to:
   transmit a time-series data item or its characteristic information item to an information distribution apparatus via a communication line to request distribution of a relevant information item of the time-series data item;
   receive the relevant information item distributed from the information distribution apparatus in response to the request, the relevant information item being associated with a characteristic information item similar to a characteristic information item extracted from the transmitted time-series data item or the transmitted characteristic information item among a plurality of characteristic information items previously stored in the information distribution apparatus, the relevant information item comprising a reference address of an information providing site providing related information for each stored characteristic information item on the communication line; and
   present the relevant information and present an access guide to the information providing site on the communication line based on the reference address included in the relevant information.

5. The terminal of claim 4,
   wherein the time-series data item is data from a sensor that measures an item, and the characteristic information item is extracted from the time-series data item from the sensor in accordance with characteristics of a measurement target.

6. The terminal of claim 4,
   wherein instructions further cause the at least one processor to implement a continuous request mode in which the time-series data item is continuously fetched and the information distribution apparatus is sequentially requested for the relevant information.

7. The terminal of claim 4, wherein the instructions further cause the at least one processor to:
   access the information providing site on the communication line based on the reference address and acquire related information from the information providing site, and
   present the related information from the information providing site together with the distributed relevant information.

8. An information distribution method implemented by executing, by at least one processor, instructions encoded on one or more second storage of an information distribution apparatus, the method comprising:
   receiving a plurality of time-series data items;
   extracting a characteristic information item from each of the time-series data items at a designated time interval;
   storing the characteristic information items and time interval information items about the time interval in one or more first storage of the information distribution apparatus;
   fetching a relevant information item comprising a reference address of an information providing site on a communication line, the information providing site configured to provide related information for each extracted characteristic information item;
   receiving from the one or more first storage the characteristic information items and time interval information items;

associating the relevant information item and the time interval information item to each corresponding characteristic information item of the characteristic information items;

storing the relevant information items in the one or more first storage;

receiving through the communication line a time-series data item or its characteristic information item presented with a request;

extracting a characteristic information item at the time interval when the time-series data item is received;

collating the extracted characteristic information item or the received characteristic information item with the stored characteristic information items;

specifying a characteristic information item among the stored characteristic information items which is at least the most similar to the extracted characteristic information item or the received characteristic information item;

fetching the relevant information item stored in the one or more first storage associating with the specified characteristic information item; and distributing the fetched relevant information item to a distribution request source via the communication line.

* * * * *